(12) United States Patent
Wu et al.

(10) Patent No.: US 12,506,648 B2
(45) Date of Patent: Dec. 23, 2025

(54) SIGNAL PROCESSING DEVICE AND ASSOCIATED SIGNAL PROCESSING METHOD

(71) Applicant: Realtek Semiconductor Corp., HsinChu (TW)

(72) Inventors: Tsung-En Wu, HsinChu (TW); Cheng-Hsien Li, HsinChu (TW); Hua-Lun Pi, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/762,674

(22) Filed: Jul. 3, 2024

(65) Prior Publication Data

US 2025/0016032 A1 Jan. 9, 2025

(30) Foreign Application Priority Data

Jul. 7, 2023 (TW) .................................. 112125392

(51) Int. Cl.
*H04L 25/03* (2006.01)

(52) U.S. Cl.
CPC .. *H04L 25/03057* (2013.01); *H04L 25/03267* (2013.01)

(58) Field of Classification Search
CPC ......... H04L 25/03006; H04L 25/03019; H04L 25/03057; H04L 25/03108; H04L 25/03146; H04L 25/03254; H04L 25/03267

USPC ...... 375/232, 233, 346, 348, 350; 333/28 R; 708/322, 323

See application file for complete search history.

(56) References Cited

U.S. PATENT DOCUMENTS

| | | | |
|---|---|---|---|
| 7,218,672 B2 | 5/2007 | Birru | |
| 2005/0041760 A1 | 2/2005 | Yousef | |
| 2009/0245448 A1* | 10/2009 | Ran | H04L 7/0004 375/373 |
| 2014/0241477 A1* | 8/2014 | Eliaz | H04L 25/03178 375/348 |
| 2021/0288836 A1* | 9/2021 | Ganesan | H04L 25/03057 |
| 2023/0318883 A1* | 10/2023 | Liao | H04L 25/03057 375/233 |

* cited by examiner

*Primary Examiner* — Young T. Tse
(74) *Attorney, Agent, or Firm* — Winston Hsu (57) ABSTRACT

A signal processing device includes a proprietary test mode symbol generating circuit, a decision error detection circuit, and a debug control circuit. The proprietary test mode symbol generating circuit generates prediction symbols as a reference signal according to decision symbols output by a slicer of a receiving signal processing circuit and a predetermined rule. The decision error detection circuit operating in a proprietary test mode continues receiving the decision symbols and the prediction symbols, and generates detection results. The debug control circuit includes a memory device, and continues recording contents of one or more signals obtained from one or more nodes of the receiving signal processing circuit into the memory device. In addition, the debug control circuit receives the detection results, and stops recording the contents of the one or more signals in response to a state of at least one of the detection results.

10 Claims, 7 Drawing Sheets

SIGNAL PROCESSING DEVICE AND ASSOCIATED SIGNAL PROCESSING METHOD

BACKGROUND OF THE INVENTION

1. Field of the Invention

The present invention is related to a signal processing device within a communication system, and more particularly, to a signal processing device that can instantly determine decision errors of receiving symbols in a data exchange phase.

2. Description of the Prior Art

A communication system includes multiple communication devices, such as a transmitter and a receiver. During a modulation process, the transmitter may set signals desired to be transmitted at a corresponding voltage level according to data contents carried by the signals, and transmit the signals after appropriate processing is performed (e.g., signal processing such as encoding or amplification). The receiver may receive signals, process received signals, and include a decision device (or slicer) to determine a corresponding voltage level of receiving symbols. In most communication systems, however, both external interference and internal interference may cause voltage offsets in transmitted signals. For example, noise in a transmission channel may cause a voltage level of the transmitted signals to deviate from its ideal voltage level (i.e., a voltage level set at the transmission terminal), thereby causing decision errors.

As a result, the communication device is equipped with related circuits/devices to compensate for the impact of the transmission channel on the signal. The compensation circuit/device may adaptively adjust/train related parameters to optimize a compensation performance. In real communication environments, however, interference and noise have time-varying characteristics. Therefore, in an actual data exchange phase, even if the related parameters have been adjusted/trained in an adaptive manner for optimization, the interference and the noise may still cause the decision errors of the decision device.

If a decision error occurs in the actual data exchange phase, data and signals within the communication device need to be captured and analyzed to determine the source problem. In a communication system with ultra-high-speed data transmission capabilities or high throughput, however, it is difficult to have enough memory capacity to completely record all internal data and signals generated by the communication device during the communication process, so that errors cannot be discovered immediately, and the difficulty of debugging is greatly increased.

As a result, a signal processing device that can instantly determine decision errors of receiving symbols and an associated signal processing method are urgently needed.

SUMMARY OF THE INVENTION

According to an embodiment of the present invention, a signal processing device is provided. The signal processing device comprises a proprietary test mode symbol generating circuit, a decision error detection circuit, and a debug control circuit. The proprietary test mode symbol generating circuit is coupled to a receiving signal processing circuit, and is arranged to generate multiple prediction symbols as a reference signal according to multiple decision symbols output by a slicer of the receiving signal processing circuit and a predetermined rule. The decision error detection circuit operates in a proprietary test mode, and is arranged to continue receiving the multiple decision symbols and the multiple prediction symbols, and generate multiple detection results. The debug control circuit is coupled to one or more nodes of the receiving signal processing circuit, comprises a memory device, and is arranged to continue recording contents of one or more signals obtained from the one or more nodes into the memory device. In addition, the debug control circuit receives the multiple detection results, and stops recording the contents of the one or more signals in response to a state of at least one of the multiple detection results.

According to an embodiment of the present invention, a signal processing method is provided. The signal processing method is arranged to process signals received by a receiver within a communication system, wherein the receiver comprises a receiving signal processing circuit, and the receiving signal processing circuit operates in a data exchange phase after parameter training of a decision feedback equalizer has been completed. The signal processing method comprises: determining to enter a proprietary test mode during the data exchange phase in response to a value of a register; generating multiple prediction symbols as a reference signal according to multiple decision symbols output by a slicer of the receiving signal processing circuit and a predetermined rule; continuing receiving and detecting the multiple decision symbols and the multiple prediction symbols, and generating multiple detection results; continuing obtaining and recording contents of one or more signals obtained from one or more nodes of the receiving signal processing circuit; and stopping recording the contents of the one or more signals in response to a state of at least one of the multiple detection results.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
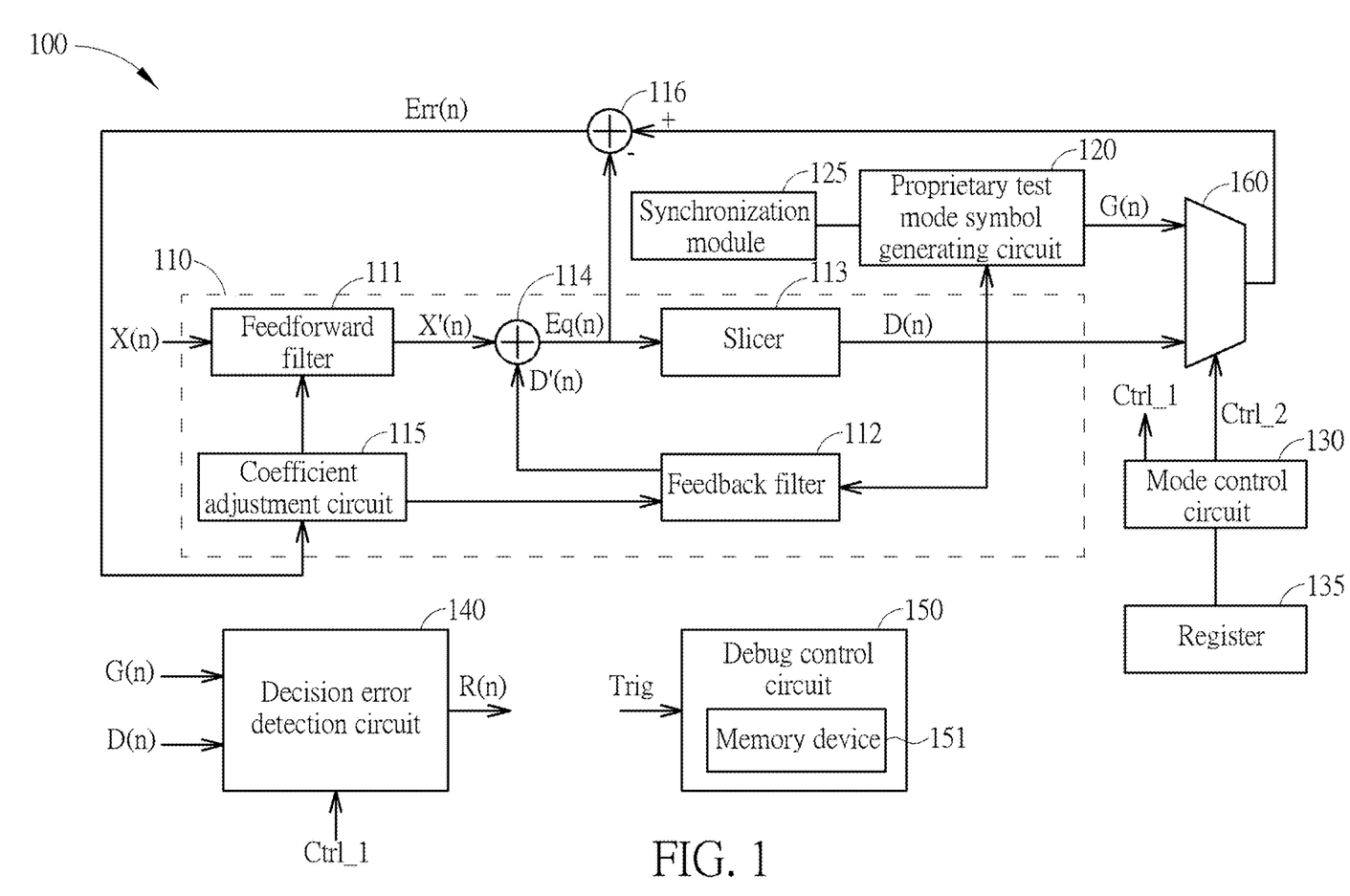
FIG. 1 is a block diagram illustrating a signal processing device according to an embodiment of the present invention.

FIG. 1 is a block diagram illustrating a signal processing device 100 according to an embodiment of the present invention. The signal processing device 100 may be configured in a communication device within a communication system. For example, the signal processing device 100 may be configured in a receiver or a receiving circuit within the communication device for processing received signals. The signal processing device 100 includes a receiving signal processing circuit 110 and multiple circuit devices for supporting the receiving signal processing circuit 110 to operate in a proprietary test mode (which are illustrated in detail in subsequent paragraphs).

The receiving signal processing circuit 110 includes a feedforward filter (which may also be referred to as a feedforward equalizer (FFE)) 111, a feedback filter (which may also be referred to as a feedback equalizer (FBE)) 112, a slicer (which may also be referred to as a decision device) 113, and an adder 114.

The feedforward filter 111 may perform a filtering operation upon an input signal $X(n)$ to generate a filtered input signal $X'(n)$. The feedback equalizer 112 may perform a filtering operation upon a decision signal $D(n)$ to generate a filtered decision signal $D'(n)$. The feedforward filter 111 and the feedback equalizer 112 may form a decision feedback equalizer (DFE). The adder 114 may be coupled to the feedforward filter 111 and the feedback equalizer 112, and may be arranged to combine the filtered input signal $X'(n)$ and the filtered decision signal $D'(n)$ to generate an equalizer output signal $Eq(n)$. The slicer 113 may generate the decision signal $D(n)$ according to the equalizer output signal $Eq(n)$. The decision signal $D(n)$ may be provided to subsequent stage circuits of the receiver (not shown in FIG. 1) to perform other signal processing required by the communication system.

The DFE may include two functions: performing the filtering operation upon the input signal and the decision signal output by the slicer for reducing the inter-signal interference caused by the channel response; and adjusting filter parameters according to an equalizer error and a predetermined optimization algorithm. The former can improve the signal-to-noise ratio or reduce the bit error rate; the latter can make the filter adapt to the channel variation.

The normal operation of the DFE relies on the slicer to generate the decision signal that is close to correct. If the slicer continues to make decision errors, the optimization algorithm for adjusting the filter parameters may continue to obtain wrong equalizer errors which cause the filter parameters to be adjusted in a wrong direction, thereby causing the filter parameters to diverge. In a serious case, the decision errors may interfere with the slicer decision and affect the equalizer output signal through the feedback path of the feedback filter 112. This phenomenon is referred to as error propagation.

The communication system may include a training phase and a data exchange phase when a connection is established between a transmission terminal and a reception terminal, wherein the training phase includes operations for parameter training. Both the transmission terminal and the reception terminal must exchange information required to establish the connection and adjust relevant system parameters (e.g., the filter parameters) through a method specified by the communication system specification during the training phase in order to complete the parameter training. After the training phase is completed and a stable connection can be established, the data exchange phase is entered to transmit and receive data. For example, during the training phase, the reception terminal may first complete channel equalization, or adjust/train relevant filter parameters. Only after the parameter adjustment/training is completed can the slicer make correct decisions. Afterwards, the data exchange stage is entered to receive data normally. During the data exchange phase, the actual application of the communication system starts, such that the data signal transmitted by the transmission terminal includes data that actually needs to be transmitted to the reception terminal.

When the communication device enters the data exchange phase and starts to transmit data, since the transmitted data is unknown to the reception terminal, the reception terminal cannot immediately detect errors when a decision error occurs. In addition, in applications of ultra-high-speed data transmission or long-term data transmission, due to the huge amount of transmitted data, it is difficult for the reception terminal to completely record information related to operations of each circuit during the transmission process, such that it is impossible to use the information for debugging.

In order to address the above-mentioned issues, a proprietary test mode of a communication system is provided in an embodiment of the present invention. In the proprietary test mode, when the slicer makes a decision error, related information of circuit operations can be immediately recorded for subsequent processing, analysis, and determination for system problems. In addition, an accurate equalizer error and an actual equalizer error can be obtained in the proprietary test mode, which is also helpful for analyzing the system problems.

According to an embodiment of the present invention, in the proprietary test mode, both the transmitter and the receiver may generate multiple symbols according to a predetermined rule, wherein the predetermined rule is mutually defaulted by the transmitter and the receiver, the symbols generated by the transmitter according to the predetermined rule are transmission symbols, the transmission symbols are transmitted to the receiver through the transmission channel, and are received by the receiver as reception symbols. In addition to the reception symbols, the receiver may generate multiple prediction symbols as a reference signal according to the predetermined rule, for determining whether a decision error occurs. As a result, both the transmitter and the receiver must know whether to enter the proprietary test mode during the data exchange phase.

According to an embodiment of the present invention, each of the transmitter and the receiver may include a mode control circuit and a register (e.g., a mode control circuit 130 and a register 135 configured in the signal processing device 100 of the receiver shown in FIG. 1). The mode control circuit 130 may determine whether to enter the proprietary test mode during the data exchange phase according to a register value stored in the register 135 to generate a determination result, and generate a control signal Ctrl_1 according to the determination result.

In an embodiment of the present invention, both the register values configured at the transmitter and configured at the receiver can be set before the connection is established. In another embodiment of the present invention, both the transmitter and the receiver may communicate with each other through the message exchange process during the training phase to determine whether to enter the proprietary test mode during the data exchange phase, and may correspondingly set respective registers according to a communication result.

For an embodiment where the register values of the transmitter and the register values of the receiver are set in advance before the connection is established, after the training phase is completed, the transmitter and the receiver may determine whether to enter the proprietary test mode according to the register values before starting the data exchange phase, or at a certain time point after the data exchange phase starts. If it is determined to enter the proprietary test mode, the transmitter starts to generate the transmission symbols according to the predetermined rule and transmits the transmission symbols to the receiver through the transmission channel. The receiver first performs a synchronization operation of the proprietary test mode according to the reception symbols to make a symbol time of the receiver align with that of the transmitter, and starts to perform subsequent operations after the synchronization operation is completed.

If it is determined not to enter the proprietary test mode, both the transmitter and the receiver maintain in the data exchange phase and perform general data exchange. For example, the data signal transmitted by the transmitter is data actually required to be transmitted to the receiver, and the data signal is unknown or unpredictable to the receiver (i.e., the content of the data will be obtained by processing and decision of the receiving signal processing circuit 110).

For an embodiment where the transmitter and the receiver communicate with each other during the training phase to determine whether to enter the proprietary test mode during the data exchange mode, the register values are set according to a communication result during the training phase. After the training phase is completed, the transmitter and the receiver may determine whether to enter the proprietary test mode according to the register values before starting the data exchange phase, or at a certain time point after the data exchange phase starts. If it is determined to enter the proprietary test mode, the transmitter starts to generate the transmission symbols according to the predetermined rule and transmits the transmission symbols to the receiver through the transmission channel. The receiver first performs a synchronization operation of the proprietary test mode according to the reception symbols to make a symbol time of the receiver align with that of the transmitter, and starts to perform subsequent operations after the synchronization operation is completed.

If it is determined not to enter the proprietary test mode, both the transmitter and the receiver maintain in the data exchange phase and perform general data exchange. For example, the data signal transmitted by the transmitter is data actually required to be transmitted to the receiver, and the data signal is unknown or unpredictable to the receiver (i.e., the content of the data will be obtained by processing and decision of the receiving signal processing circuit 110).

According to an embodiment of the present invention, if it is determined to enter the proprietary test mode, the receiver must first perform the synchronization operation of the proprietary test mode according to the reception symbols to align the symbol times.

In an embodiment of the present invention, the signal processing device 100 may include a proprietary test mode symbol generating circuit 120 and a synchronization module 125. The proprietary test mode symbol generating circuit 120 may be coupled to the receiving signal processing circuit 110, and may generate multiple prediction symbols as a reference signal according to the above-mentioned predetermined rule. In an embodiment of the present invention, the proprietary test mode symbol generating circuit 120 may generate multiple prediction symbols as a reference signal according to multiple decision symbols output by the slicer 113 and a predetermined rule. In addition, in an embodiment of the present invention, the proprietary test mode symbol generating circuit 120 may be implemented by a linear feedback shift register (LFSR).

Figure 2:
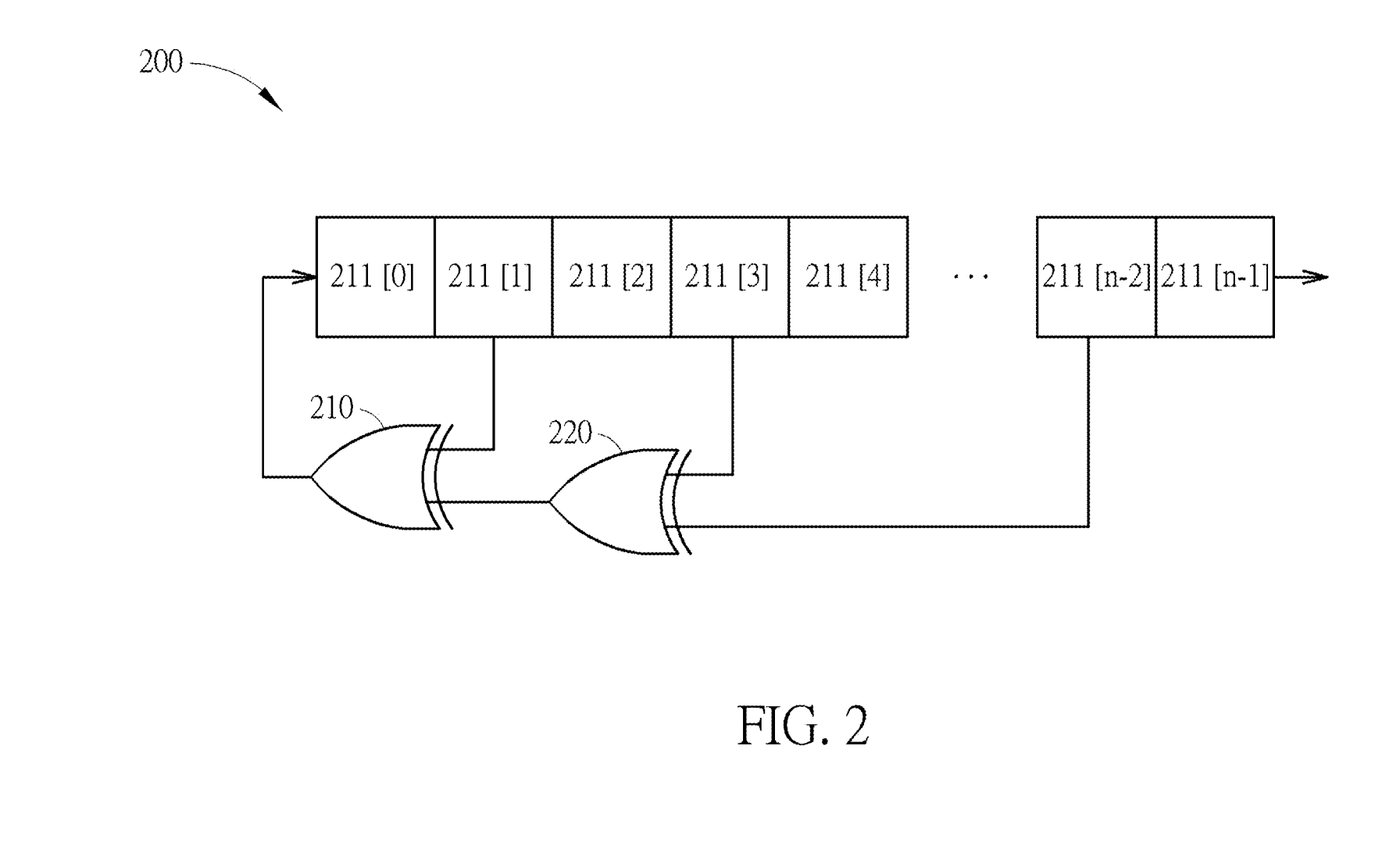
FIG. 2 is a diagram illustrating an example of a linear feedback shift register according to an embodiment of the present invention.

FIG. 2 is a diagram illustrating an example of an LFSR 200 according to an embodiment of the present invention. The LFSR 200 may include n-stage registers 211[0]-211[n−1] and one or more operational logic gates (e.g., exclusive or (XOR) logic gates 210 and 220 shown in FIG. 2). A value of each register may be set as 0 or 1, and may be shifted one stage to right every time unit: that is, the value stored in the register 211[0] may be shifted to the register 211[1], the value stored in the register 211[1] may be shifted to the register 211[2], . . . , and the value stored in the register 211[n−1] may be shifted out of the register 211[n−1] as an output signal of the LFSR 200. In addition, the value stored in the register 211[0] may be set as a calculation result of the XOR logic gates. Taking FIG. 2 as an example, the value stored in the register 211[0] may be set as a calculation result of the XOR logic gates 210 and 220.

It should be noted that FIG. 2 is only one example of a circuit that can be used to implement the proprietary test mode symbol generating circuit, and the present invention is not limited thereto.

In an embodiment of the present invention, the predetermined rule mutually defaulted by the transmitter and the receiver may be (but is not limited to) the XOR logic gate calculation rule. For example, the proprietary test mode symbol generating circuits of the transmitter and the receiver may adopt an LFSR with the same structure, such that the multiple symbols may be generated according to the predetermined rule mutually defaulted by the transmitter and the receiver. As mentioned above, the symbols generated by the transmitter according to the predetermined rule are the transmission symbols, wherein the transmission symbols are transmitted to the receiver through the transmission channel, and the receiver receives the transmission symbols as the reception symbols. In addition to the reception symbols, the receiver may be further arranged to generate multiple prediction symbols as the reference signal according to the predetermined rule for determining whether a decision error occurs.

When the proprietary test mode is started, although the receiver knows the predetermined rule for generating the symbols, the receiver still cannot directly know the symbol time corresponding to the transmission symbols from the reception symbols. As a result, in order to make the transmission symbols synchronize with the prediction symbols generated according to the same rule by the receiver, the receiver may perform the synchronization operation of the proprietary test mode through the synchronization module 125 to align the symbol time. Once the prediction symbols and the transmission symbols are synchronized, a decision error detection circuit 140 can accurately determine whether a decision error occurs.

According to an embodiment of the present invention, in the synchronization operation, the receiving signal processing circuit 110 may receive and process multiple reception symbols in sequence, such that the slicer 113 may correspondingly generate multiple decision symbols. The proprietary test mode symbol generating circuit 120 may receive the multiple decision symbols from the slicer 113, and store the multiple decision symbols into the register as an initial value. Afterwards, the proprietary test mode symbol generating circuit 120 may generate multiple prediction symbols in sequence according to the above-mentioned predetermined rule. The proprietary test mode symbol generating circuit 120 may continue to generate the prediction symbols. As this moment, the receiving signal processing circuit 110 may also continue to receive and process the latest reception symbol. The synchronization module 125 may be coupled to the proprietary test mode symbol generating circuit 120, and may include one or more comparison circuits for adjusting a symbol time corresponding to the multiple prediction symbols during the proprietary test mode, which makes the symbol time corresponding to the multiple prediction symbols align with that corresponding to multiple transmission symbols transmitted by the transmitter. In detail, the synchronization module 125 may compare a current prediction symbol generated according to the predetermined rule by the proprietary test mode symbol generating circuit 120 with a current decision symbol output by the slicer 113 to generate a comparison result. In response to the comparison result indicating that the current prediction symbol does not match the current decision symbol, the synchronization module 125 may adjust a symbol time corresponding to the prediction symbols, to try to align the symbol time corresponding to the prediction symbols with that corresponding to multiple transmission symbols transmitted by the transmitter. For example, the synchronization module 125 may notify the proprietary test mode symbol generating circuit 120 to re-store the latest decision symbol into the register as the initial value (or adjust or update content of the register by other methods), and to re-generate the multiple prediction symbols in sequence according to the above-mentioned predetermined rule.

In response to the comparison result indicating that the current prediction symbol matches the current decision symbol, the synchronization module 125 may continue to perform comparison operations upon one or more subsequent prediction symbols and one or more subsequent decision symbols. In response to the comparison result indicating that the current prediction symbol does not match the current decision symbol, the synchronization module 125 may adjust a symbol time corresponding to the prediction symbols again. If a certain number of prediction symbols are determined to match the decision symbols, the synchronization module 125 may determine that the symbol time corresponding to the prediction symbols aligns with that corresponding to the transmission symbols, and the synchronization operation of the proprietary test mode is completed (i.e., the prediction symbols and the transmission symbols are synchronized). Once the prediction symbols and the transmission symbols are synchronized in the proprietary test mode, the prediction symbols generated by the proprietary test mode symbol generating circuit 120 will be consistent with the transmission symbols generated by the transmitter, and the prediction symbols will theoretically be consistent with the decision symbols output by the slicer 113.

Refer back to FIG. 1. In addition to the receiving signal processing circuit 110, the proprietary test mode symbol generating circuit 120, the synchronization module 125, the mode control circuit 130, and the register 135, the signal processing device 110 may further include a coefficient adjustment circuit 115 (which may also be regarded as a portion of the receiving signal processing circuit 110), the decision error detection circuit 140, and a debug control circuit 150.

In an embodiment of the present invention, the decision error detection circuit 140 may receive the control signal Ctrl_1, and operate in the proprietary test mode in response to the control signal Ctrl_1. For example, the mode control circuit 130 may generate the control signal Ctrl_1 after determining that the proprietary test mode needs to be entered and the synchronization operation of the proprietary test mode is completed. The decision error detection circuit 140 may continue receiving multiple decision symbols and multiple prediction symbols in response to the control signal Ctrl_1, and correspondingly generate multiple detection results, wherein the multiple decision symbols and the multiple prediction symbols are represented as a decision signal D(n) and a reference signal G(n) in FIG. 1, respectively, the decision signal D(n) includes the multiple decision symbols generated in sequence by the slicer 113, the reference signal G(n) includes the multiple prediction symbols generated in sequence by the proprietary test mode symbol generating circuit 120, the multiple detection results are represented as a detection result signal R(n) in FIG. 1, and the detection result signal R(n) includes the multiple detection results generated in sequence by the decision error detection circuit 140. The debug control circuit 150 may receive the multiple detection results, and stop recording contents of one or more signals obtained from one or more nodes of the receiving signal processing circuit 110 (e.g., input nodes or output nodes of any component included in the receiving signal processing circuit 110) in response to a state of at least one of the multiple detection results.

Specifically, in an embodiment of the present invention, since the timing and contents of the prediction symbols and the transmission symbols have been synchronized after the synchronization operation of the proprietary test mode is completed, the prediction symbols may be regarded as a golden signal (i.e., the prediction symbols includes correct symbol contents). As a result, the decision error detection circuit 140 may determine whether a decision error occurs by comparing the symbol contents of the decision signal D(n) with those of the reference signal G(n). If the symbol contents of decision signal D(n) are different from those of the reference signal G(n), it means that a decision error occurs. The decision error detection circuit 140 may set a state of a corresponding detection result in the detection result signal R(n) to indicate a decision error occurs, such that the debug control circuit 150 may accordingly stop recording contents of one or more signals.

Figure 3:
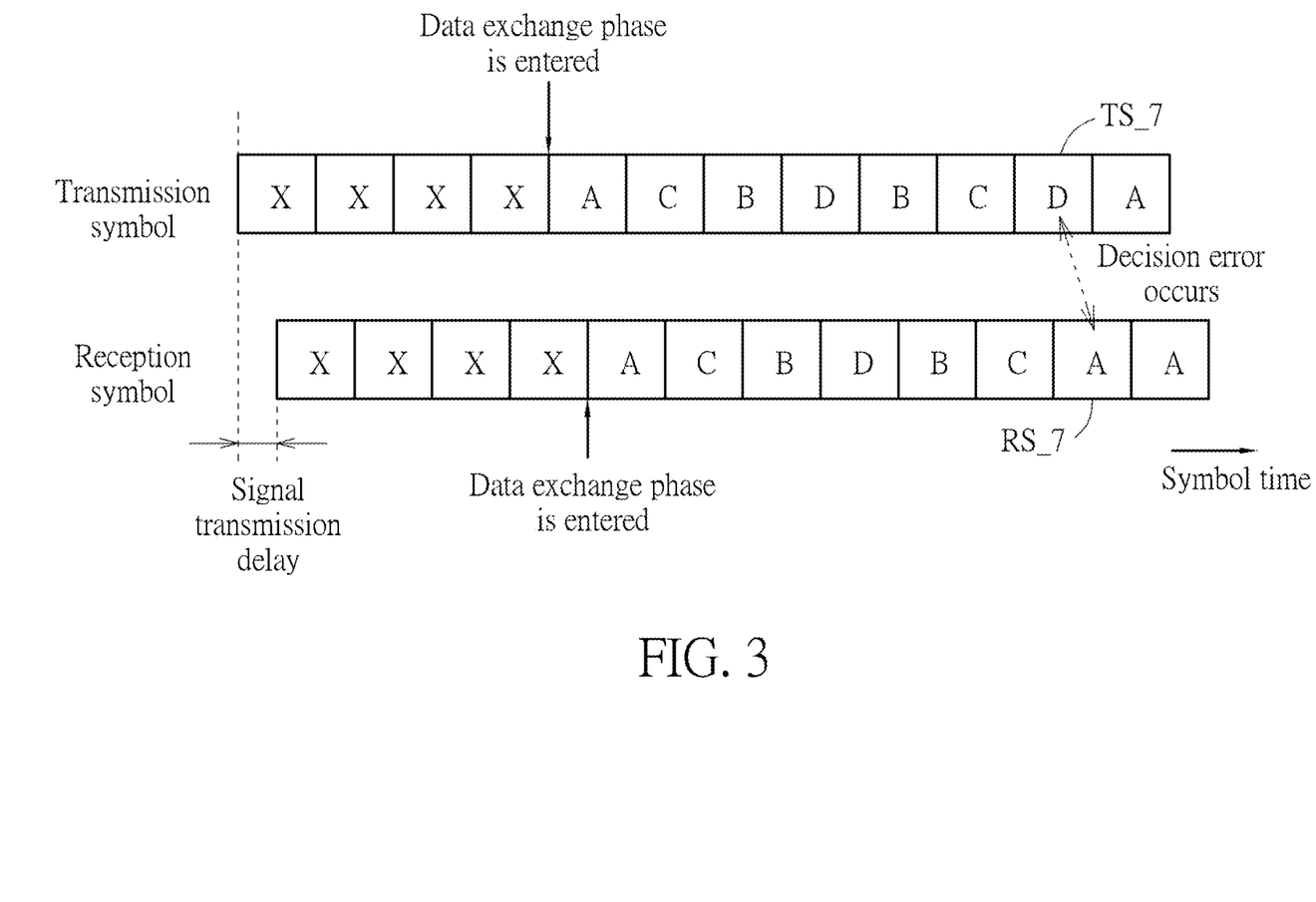
FIG. 3 is a diagram illustrating a decision error occurring at a receiver according to an embodiment of the present invention.

FIG. 3 is a diagram illustrating a decision error occurring at a receiver according to an embodiment of the present invention. As shown in FIG. 3, assuming that contents of reception symbols corresponding to a symbol time RS_7 of the receiver do not match those of transmission symbols corresponding to a symbol time TS_7 of the receiver, a decision error may occur at the receiver, and the decision error may be detected by a comparison result of the decision signal D(n) and the reference signal G(n).

Refer back to FIG. 1. In an embodiment of the present invention, the debug control circuit 150 may be coupled to one or more nodes of the receiving signal processing circuit 110, and may include a memory device 151. The debug control circuit 150 may continue recording contents of one or more signals obtained from the one or more nodes into the memory device 151 in the proprietary test mode. In addition, the debug control circuit 150 may receive a trigger signal Trig, and stop recording the contents of the one or more signals in response to the trigger signal Trig.

According to an embodiment of the present invention, the contents of the one or more signals are stored into the memory device 151 as multiple current records. Since the capacity of the memory device 151 is limited, when the memory device 151 is full, the contents of the latest one or more signals will be written into the memory device 151 by overwriting from scratch, to overwrite contents stored in the memory device 151 (i.e., existing current records). In other words, by the overwriting operation, the current records stored in the memory device 151 may be updated. When the debug control circuit 150 stops recording the contents of the one or more signals in response to the trigger signal Trig, the debug control circuit 150 stops overwriting the contents stored in the memory device 151 with the contents of the latest one or more signals (i.e., the debug control circuit 150 stops updating the current records), to retain the current records currently stored in memory device 151.

According to an embodiment of the present invention, the trigger signal Trig received by the debug control circuit 150 may be a signal indicating that a decision error occurs (e.g., the detection result signal R(n) or another signal). According to an embodiment of the present invention, the signals recorded in the memory device 151 by the debug control circuit 150 may be any internal signals of the signal processing device 100, which include but are not limited to: the equalizer output signal, the output signal of the feedforward filter 111, the decision signal D(n), and so on.

In addition to detecting the decision error and immediately retaining the records stored in the memory device 151 when the decision error is detected, a multiplexer (MUX) 160 may be used to selectively provide an accurate equalizer error and an actual equalizer error to the coefficient adjustment circuit 115 in the proprietary test mode. Specifically, in an embodiment of the present invention, the mode control circuit 130 may issue another control signal Ctrl_2 to control whether to select errors during the proprietary test mode. The MUX 160 may select which of the reference signal G(n) and the decision signal D(n) to provide to an adder 116 in response to the setting of the control signal Ctrl_2. If the MUX 160 provides the reference signal G(n) to the adder 116, an equalizer error signal Err (n) output by the adder 116 may be the accurate equalizer error (i.e., an equalizer error obtained by subtracting the equalizer output signal Eq(n) from the reference signal G(n)). If the MUX 160 provides the decision signal D(n) to the adder 116, the equalizer error signal Err (n) may be the actual equalizer error (i.e., an equalizer error obtained by subtracting the equalizer output signal Eq(n) from the decision signal D(n)).

The coefficient adjustment circuit may adaptively adjust one or more coefficients of the DFE according to the equalizer error signal Err (n). During the proprietary test mode, the equalizer error signal Err (n) is not limited to the actual equalizer error, and may also be the accurate equalizer error generated according to the reference signal G(n) and the equalizer output signal Eq(n) of the DFE, which is helpful for analyzing the system problems.

Figure 4:
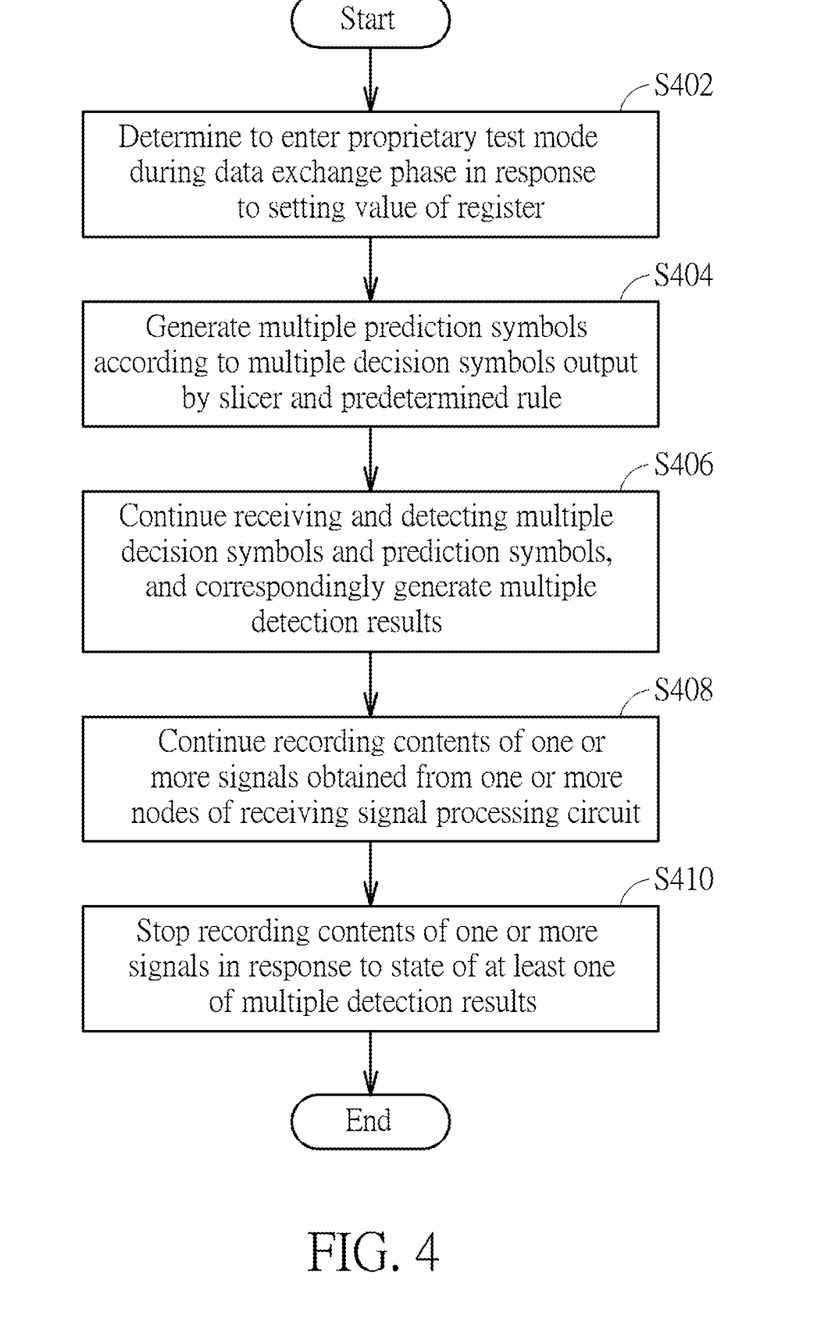
FIG. 4 is a flow chart of a signal processing method according to an embodiment of the present invention.

FIG. 4 is a flow chart of a signal processing method according to an embodiment of the present invention. The signal processing method may process received signals of a receiver within a communication system, wherein the receiver may include a receiving signal processing circuit. In addition, the signal processing method may be applicable to the receiving signal processing circuit operating in a data exchange phase after the parameter training of the DFE is completed, to thereby address the problems in the related art that errors cannot be detected immediately during the data exchange phase. The signal processing method may include the following steps.

In Step S402, a mode control circuit determines to enter a proprietary test mode during the data exchange phase in response to a value (e.g., a setting value) of a register. As mentioned above, the mode control circuit 130 may determine whether to enter the proprietary test mode during the data exchange phase according to a value of the register 135.

In Step S404, a proprietary test mode symbol generating circuit generates multiple prediction symbols as a reference signal according to multiple decision symbols output by a slicer of the receiving signal processing circuit and a pre-determined rule. In an embodiment of the present invention, the multiple prediction symbols generated in Step S404 may be provided to the synchronization module 125 to perform the synchronization operation of the proprietary test mode.

In Step S406, a decision error detection circuit continues receiving and detecting multiple decision symbols and multiple prediction symbols, and correspondingly generates multiple detection results. In an embodiment of the present invention, after the synchronization operation is completed, the proprietary test mode symbol generating circuit 120 may continue to generate the latest prediction symbol according to the predetermined rule. At this moment, the receiving signal processing circuit 110 may also continue to receive and process the latest reception symbol, such that the slicer 113 may continue to generate the latest decision symbol. The decision error detection circuit 140 may perform the decision error detection according to the latest prediction symbol and the latest decision symbol, and correspondingly generate the latest detection result.

In Step S408, a debug control circuit continues recording contents of one or more signals obtained from one or more nodes of the receiving signal processing circuit. As mentioned above, during the proprietary test mode, the debug control circuit 150 may continue recording the contents of the one or more signals obtained from the one or more nodes into the memory device 151. In an embodiment of the present invention, after the synchronization operation is completed, Steps S406 and S408 may be executed in parallel.

In Step S410, the debug control circuit stops recording the contents of the one or more signals in response to a state of at least one of multiple detection results. In an embodiment of the present invention, the debug control circuit 150 may stop recording the contents of the one or more signals (i.e., stop overwriting contents stored in the memory device 151 with contents of the latest one or more signals) in response to a state of detection results (or other signals that can be used as sources of the trigger signal) generated by the decision error detection circuit 140, and thereby retain the current records currently stored in the memory device 151. The debug control circuit 150 may be coupled to one or more external devices through a debug interface, such that internal data and signals of the communication device recorded in the memory device 151 can be provided to the external device through the debug interface for analyzing and debugging.

According to an embodiment of the present invention, the debug control circuit 150 may include multiple operation modes, and may receive an external control signal through the debug interface, and switch to different operation modes according to the external control signal, wherein the difference among the multiple operation modes may at least include a stopping method for stopping the recording behavior in response to a signal level or a predetermined state of the trigger signal.

Figure 5A:
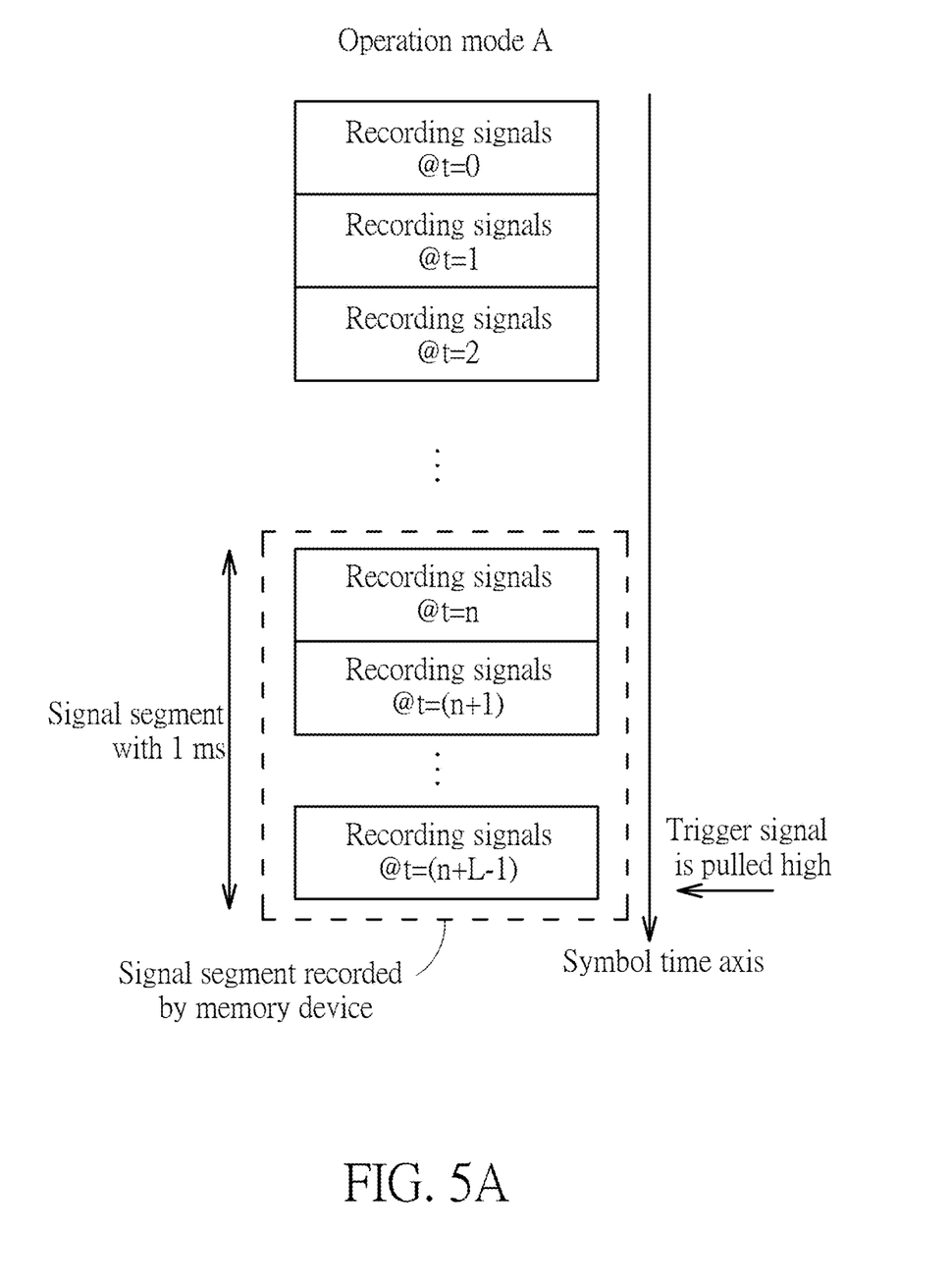
FIG. 5A is a diagram illustrating operations of stopping recording in a first operation mode according to an embodiment of the present invention.
Figure 5B:
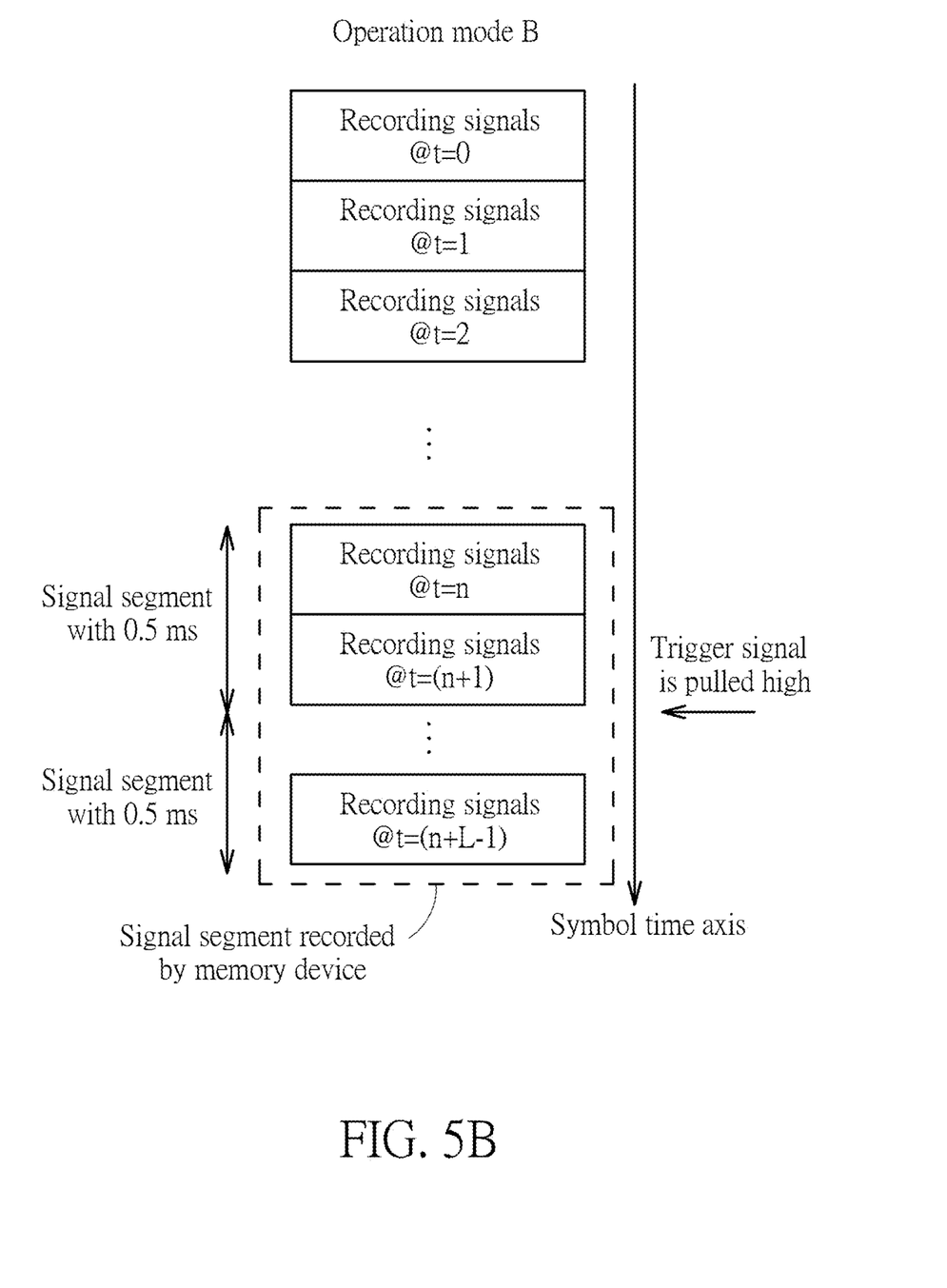
FIG. 5B is a diagram illustrating operations of stopping recording in a second operation mode according to an embodiment of the present invention.
Figure 5C:
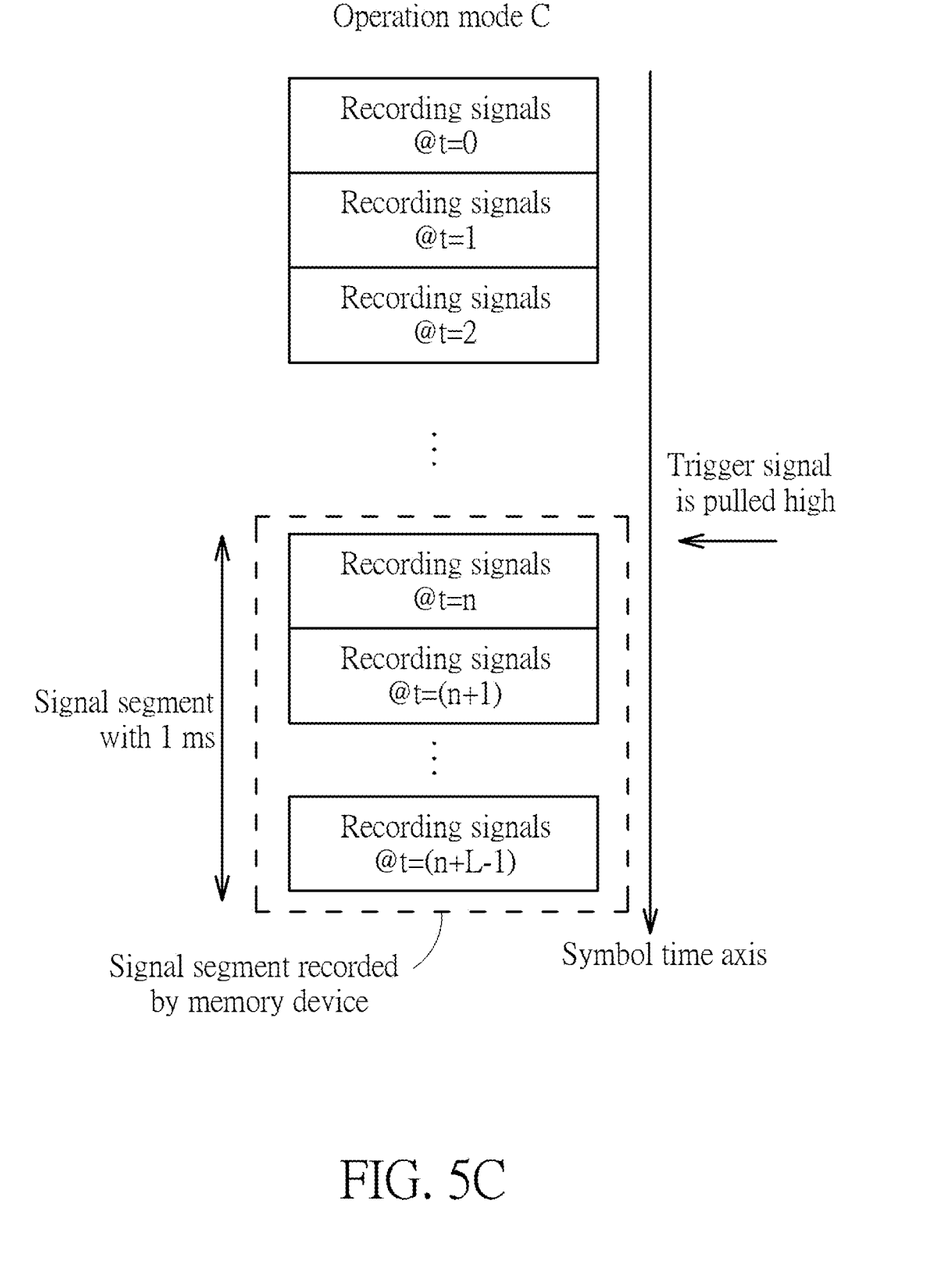
FIG. 5C is a diagram illustrating operations of stopping recording in a third operation mode according to an embodiment of the present invention.

FIG. 5A is a diagram illustrating operations of stopping recording in a first operation mode (e.g., an operation mode A) according to an embodiment of the present invention. FIG. 5B is a diagram illustrating operations of stopping recording in a second operation mode (e.g., an operation mode B) according to an embodiment of the present invention. FIG. 5C is a diagram illustrating operations of stopping recording in a third operation mode (e.g., an operation mode C) according to an embodiment of the present invention. Assume that the memory space of the memory device 151 is designed to record a signal segment with a time window of 1 millisecond (ms), and the debug control circuit 150 stops recording contents of one or more signals in response to the trigger signal being pulled high. In the operation mode A, the debug control circuit 150 may continuously record the contents of the one or more signals into the memory space of the memory device 151. If the memory space of the memory device 151 is full, the existing record will be overwritten from scratch until the recording is stopped when the trigger signal Trig is detected to be high. Assume that the signal segment with the time window of 1 ms is equal to L symbol times, and the debug control circuit 150 starts to continue recording signals at a time t=0 ("Recording signals @ t=0" in FIG. 5A represents signal contents recorded at the time t=0, and so on) until the recording is stopped when the trigger signal Trig is detected to be high at a time t=(n+L−1). The signal segment with the time window of 1 ms recorded in the memory space of the memory device 151 may include signal contents recorded from a time t=n to the time t=(n+L−1).

Refer to FIG. 5B. Assume that the signal segment with the time window of 1 ms is equal to L symbol times, and the debug control circuit 150 starts to continue recording signals at a time t=0 ("Recording signals @ t=0" in FIG. 5B represents signal contents recorded at the time t=0, and so on). In the operation mode B, the debug control circuit 150 may continuously record the contents of the one or more signals into the memory space of the memory device 151. If the memory space of the memory device 151 is full, the existing record will be overwritten from scratch until the recording is stopped after the trigger signal Trig is detected to be high for 0.5 ms (which is equivalent to writing half of the memory space). As a result, the signal segment with the time window of 1 ms recorded in the memory space of the memory device 151 may include signal contents recorded from the time t=n to the time t=(n+L−1).

Refer to FIG. 5C. Assume that the signal segment with the time window of 1 ms is equal to L symbol times, and the debug control circuit 150 starts to continue recording signals at a time t=0 ("Recording signals @ t=0" in FIG. 5C represents signal contents recorded at the time t=0, and so on). In the operation mode C, the debug control circuit 150 may continuously record the contents of the one or more signals into the memory space of the memory device 151 after the trigger signal is pulled high, until memory space of the memory device 151 is full. Assume that the trigger signal is pulled high at the time t=n. The signal segment with the time window of 1 ms recorded in the memory space of the memory device 151 may include signal contents recorded from the time t=n to the time t=(n+L−1).

It should be noted that, although the contents of the signals recorded in the memory device 151 are the same in the above three operation modes, the time points at which the trigger signal is pulled high in the three operation modes are different. As a result, if the trigger signal is pulled high at the same time point, the contents of the signals recorded in the memory device 151 may be different in the three operation modes. Therefore, the signal contents can be captured in different ways through the settings of different operation modes, which is helpful for analyzing the system problems from different perspectives.

In summary, in the embodiments of the present invention, by operating in the proprietary test mode, when the slicer makes a decision error, the decision error can be immediately detected, and related information of circuit operations can be immediately recorded for subsequent processing, analysis, and determination for system problems. In addition, during the proprietary test mode, an accurate equalizer error and an actual equalizer error can be obtained, and signal contents can be captured in different ways through settings of different operation modes, which is also helpful for analyzing the system problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing device, comprising:
   a proprietary test mode symbol generating circuit, coupled to a receiving signal processing circuit, and arranged to generate multiple prediction symbols as a reference signal according to multiple decision symbols output by a slicer of the receiving signal processing circuit and a predetermined rule;
   a decision error detection circuit, operating in a proprietary test mode, and arranged to continue receiving the multiple decision symbols and the multiple prediction symbols, and generate multiple detection results; and
   a debug control circuit, coupled to one or more nodes of the receiving signal processing circuit, comprising a memory device, and arranged to continue recording contents of one or more signals obtained from the one or more nodes into the memory device,
   wherein the debug control circuit receives the multiple detection results, and stops recording the contents of the one or more signals in response to a state of at least one of the multiple detection results.

2. The signal processing device of claim 1, wherein when the state of the at least one of the multiple detection results indicates a decision error occurs, the debug control circuit stops recording the content of the one or more signals.

3. The signal processing device of claim 1, wherein the receiving signal processing circuit operates in a data exchange phase after parameter training of a decision feedback equalizer of the receiving signal processing circuit has been completed, and the signal processing device further comprises:
   a register; and
   a mode control circuit, coupled to the register, and arranged to determine whether to enter the proprietary test mode during the data exchange phase according to a value of the register.

4. The signal processing device of claim 1, further comprising:
   a coefficient adjustment circuit of the receiving signal processing circuit, arranged to adaptively adjust one or more coefficients of a decision feedback equalizer of the receiving signal processing circuit according to an equalizer error signal, wherein in the proprietary test mode, the equalizer error signal is generated according to the reference signal and an output signal of the decision feedback equalizer.

5. The signal processing device of claim 1, further comprising:
   a synchronization module, coupled to the proprietary test mode symbol generating circuit, and arranged to adjust a symbol time of the multiple prediction symbols in the proprietary test mode to make the symbol time align with a symbol time corresponding to multiple transmitting symbols.

6. The signal processing device of claim 5, wherein the synchronization module compares a current prediction symbol generated by the proprietary test mode symbol generating circuit according to the predetermined rule and a current decision symbol output by the slicer; and when the current prediction symbol matches the current decision symbol, the synchronization module determines that the symbol time of the multiple prediction symbols aligns with the symbol time corresponding to the multiple transmitting symbols.

7. A signal processing method, arranged to process signals received by a receiver within a communication system, wherein the receiver comprises a receiving signal processing circuit, the receiving signal processing circuit operates in a data exchange phase after parameter training of a decision feedback equalizer of the receiving signal processing circuit has been completed, wherein the signal processing method comprises:

determining, by a mode control circuit, whether to enter a proprietary test mode during the data exchange phase in response to a value of a register;

generating, by a proprietary test mode symbol generating circuit, multiple prediction symbols as a reference signal according to multiple decision symbols output by a slicer of the receiving signal processing circuit and a predetermined rule;

continuing receiving and detecting, by a decision error detection circuit, the multiple decision symbols and the multiple prediction symbols, and generating multiple detection results;

continuing obtaining and recording, by a debug control circuit, contents of one or more signals obtained from one or more nodes of the receiving signal processing circuit; and     stopping recording, by the debug control circuit, the contents of the one or more signals in response to a state of at least one of the multiple detection results.

8. The signal processing method of claim 7, wherein the contents of the one or more signals are stored in a memory device of the debug control circuit as multiple current records, and the step of continuing obtaining and recording the contents of the one or more signals obtained from the one or more nodes of the receiving signal processing circuit comprises:

in response to the memory device being full, overwriting contents stored in the memory device with latest contents of the one or more signals to update the multiple current records;

wherein the step of stopping recording the contents of the one or more signals in response to the state of the at least one of the multiple detection results comprises:

in response to the state of the at least one of the multiple detection results indicating that a decision error occurs, stopping overwriting the contents stored in the memory device with the latest contents of the one or more signals to retain the multiple current records.

9. The signal processing method of claim 7, further comprising:

generating an equalizer error signal according to an output signal of the decision feedback equalizer of the receiving signal processing circuit and the reference signal; and     adaptively adjusting one or more coefficients of the decision feedback equalizer according to the equalizer error signal.

10. The signal processing method of claim 7, further comprising:

adjusting a symbol time of the multiple prediction symbols to make the symbol time align with a symbol time corresponding to multiple transmitting symbols;

wherein in response to a current prediction symbol generated according to the predetermined rule matching a current decision symbol output by the slicer, determining that the symbol time of the multiple prediction symbols aligns with the symbol time corresponding to the multiple transmitting symbols.

\* \* \* \* \*